(12) United States Patent
Jantke et al.

(10) Patent No.: US 11,158,855 B2
(45) Date of Patent: Oct. 26, 2021

(54) POLYMER-GRAFTED SILICON PARTICLES

(71) Applicant: WACKER CHEMIE AG, Munich (DE)

(72) Inventors: Dominik Jantke, Burghausen (DE); Stefan Haufe, Neubiberg (DE); Jürgen Stohrer, Pullach (DE)

(73) Assignee: Wacker Chemie AG, Munich (DE)

( * ) Notice: Subject to any disclaimer, the term of this patent is extended or adjusted under 35 U.S.C. 154(b) by 181 days.

(21) Appl. No.: 16/484,823

(22) PCT Filed: Feb. 9, 2017

(86) PCT No.: PCT/EP2017/052878
§ 371 (c)(1),
(2) Date: Aug. 8, 2019

(87) PCT Pub. No.: WO2018/145749
PCT Pub. Date: Aug. 16, 2018

(65) Prior Publication Data
US 2020/0028173 A1    Jan. 23, 2020

(51) Int. Cl.
*H01M 4/60*    (2006.01)
*H01M 4/137*   (2010.01)
*H01M 4/62*    (2006.01)
*H01M 10/0525* (2010.01)
*H01M 4/02*    (2006.01)

(52) U.S. Cl.
CPC ........... *H01M 4/604* (2013.01); *H01M 4/137* (2013.01); *H01M 4/625* (2013.01); *H01M 10/0525* (2013.01); *H01M 2004/027* (2013.01)

(58) Field of Classification Search
CPC ....... H01M 10/0525; H01M 2004/027; H01M 4/0471; H01M 4/134; H01M 4/137; H01M 4/1395; H01M 4/386; H01M 4/604; H01M 4/625
See application file for complete search history.

(56) References Cited

U.S. PATENT DOCUMENTS

2016/0093879 A1    3/2016    Song et al.
2016/0164081 A1    6/2016    Cui et al.
2018/0212234 A1    7/2018    Haufe

FOREIGN PATENT DOCUMENTS

DE    102015215415 A1    2/2017
EP    1313158 A2         5/2003
WO    13175241 A1        11/2013

OTHER PUBLICATIONS

XP002767972—Surface Modification of Silica Nanoparticles Dissertation by Rajesh Ranjan, May 2008.

*Primary Examiner* — Carlos Barcena
(74) *Attorney, Agent, or Firm* — Brooks Kushman P.C.

(57) ABSTRACT

The invention relates to polymer-grafted silicon particles, wherein the silicon particles have an average particle size (d50) of 700 nm to 10 μm and the polymers of the polymer-grafted silicon particles are attached to the silicon particles in a wash-stable manner in an aqueous medium.

10 Claims, No Drawings

POLYMER-GRAFTED SILICON PARTICLES

CROSS-REFERENCE TO RELATED APPLICATIONS

This application is a U.S. National Phase Application of PCT/EP2017/052878, filed Feb. 9, 2017 the contents of which are incorporated herein by reference in their entireties for all purposes.

FIELD OF THE INVENTION

The invention relates to polymer-grafted silicon particles, methods for grafting silicon particles with polymers and the use of polymer-grafted silicon particles in anode materials in lithium ion batteries.

BACKGROUND OF THE INVENTION

Rechargeable lithium ion batteries are nowadays the most practically useful electrochemical energy storage means with maximum gravimetric energy densities. Silicon has a particularly high theoretical material capacity (4200 mAh/g) and is for this reason particularly suitable as active material for anodes in lithium ion batteries. Anodes are produced by means of anode inks, in which the individual constituents of the anode material are dispersed in a solvent. As solvent for this purpose on an industrial scale, water is mostly used for economic and ecological reasons. However, the silicon surface is highly reactive to water and is oxidized on contact with water forming silicon oxides and hydrogen. The release of hydrogen on processing anode inks leads to considerable difficulties. For example, such inks may give rise to inhomogeneous electrode coatings due to trapped gas bubbles. In addition, hydrogen formation renders laborious safety precautions necessary. Finally, undesired oxidation of silicon results in reduction of the proportion of elemental silicon in the anode which reduces the capacity of the lithium ion battery.

Disadvantageously, electrode-active materials containing silicon, on charging or discharging with lithium, suffer from extreme volume changes of up to around 300%. Due to this volume change, there is a pronounced mechanical stress on the active material and the whole electrode structure which, through electrochemical milling, leads to loss of electrical contact and thus to deterioration of the electrode with loss of capacity. Furthermore, the surface of the silicon anode material used reacts with constituents of the electrolyte, continuously forming passivating protective layers (solid electrolyte interphase; SEI), which leads to irreversible loss of mobile lithium.

Lithium ion batteries with anode materials containing silicon particles are known, for example, from EP1313158. The silicon particles of EP1313158 have average particle sizes of 100 to 500 nm. In EP1313158, larger particles are considered as disadvantageous for the coulombic efficiency of the corresponding batteries. To protect against uncontrolled oxidation, the silicon particles in EP1313158, after their production by milling, were subjected to a specific oxidative treatment with oxygen-containing gases or alternatively the surface of the silicon particles were covered with polymers. In one variant, ethylenically unsaturated monomers were polymerized in the presence of silicon particles. Non-functionalized alkenes such as 1-decene or 1-octene were used as monomers. In a further variant, the surface of the silicon particles was coated with water-soluble polymers. Through our own testing, it has been established that wash-stable binding of the polymers to the surface of the silicon particles is not achieved by mere coating. Finally, embedding the silicon particles in polymers of non-functionalized alkenes may result in anode coatings that are inhomogeneous.

WO13175241 describes silicon particles which have been coated with polymers bearing carboxylate or sulfonate groups, with the essential proviso that the polymers are insoluble in NMP. The coating is effected by mixing the silicon particles with aqueous solutions of the polymers and subsequent drying. The surface coating thus obtained is not wash-stable during aqueous processing, which can lead to oxidation of the surface of the silicon particles to a considerable extent.

US2016093879 discloses composite particles for lithium ion batteries based on aggregated silicon particles having average particle sizes of 1 to 500 nm, the surface of which is coated with (meth)acrylic polymers and crystalline carbon-based nanosheets.

Core-shell composite particles can be found in US2016164081, of which the cores consist of aggregated silicon particles having average particle sizes of 1 to 500 nm, and of which the shells are based on carbon. For the production thereof, the surface of the silicon particles are firstly silanized with functionalized, alkoxy-substituted silanes. In the presence of the silicon particles thus treated, acrylic or phenol resin was polymerized with acrylonitrile for example. The polymers were then carbonized. The composite particles thus obtained were less than 1 μm, in aggregated form, and were used to produce lithium ion batteries. In US2016164081, it is mandatory that the polymers can be converted by heating to a carbon layer.

BRIEF SUMMARY OF THE INVENTION

Against this background, the object consisted of providing silicon particles which, when used in aqueous ink formulations for producing anodes for lithium ion batteries, result in no or minimal hydrogen formation, particularly cause no foaming of aqueous ink formulations or no poor pumpability of the inks and also enable the advantageous incorporation of the highest possible proportion of silicon into the anodes and also should give the maximum possible homogeneous anode coatings. The object should be achieved, preferably also for ink formulations of neutral pH. In addition, also improvement should be achieved as far as possible of the electrochemical performance of corresponding lithium ion batteries having anodes containing silicon particles.

The invention relates to polymer-grafted silicon particles, wherein the silicon particles have average particle sizes ($d_{50}$) of 700 nm to 10 μm and the polymers of the polymer-grafted silicon particles are attached to the silicon particles in a wash-stable manner in an aqueous medium.

The invention further relates to methods for producing polymer-grafted silicon particles, in which one or more ethylenically unsaturated monomers are polymerized in the presence of silicon particles having average particle sizes ($d_{50}$) of 700 nm to 10 μm by means of radically initiated polymerization, wherein the surface of the silicon particles used for the polymerization bears one or more functional groups selected from the group comprising a) Si—H groups, b) organic functional groups selected from the group comprising alkanes and aromatics, and c) ethylenically unsaturated silane groups.

The invention further relates to polymer-grafted silicon particles obtainable by the method according to the invention.

The polymer-grafted silicon particles are also referred to below as grafted silicon particles for short.

DETAILED DESCRIPTION OF PREFERRED EMBODIMENTS

In the grafted silicon particles, the polymers are generally attached to the silicon particles by one or more covalent bonds. Without being bound to a theory, it can be assumed that the polymers are attached to the silicon particles via Si—C bonds in the grafted silicon particles according to the invention. Binding of this kind is accessible by the method according to the invention. In conventional products in contrast, the silicon particles are merely coated with polymers without any covalent bonding between silicon particles and polymers, or there is unstable or insufficient binding, such as silyl ester bonding between silicon particles and polymers such as may be formed, for example, in the condensation of silicon particles and appropriate polymers bearing hydroxyl or carboxyl groups.

The volume-weighted particle size distribution of the silicon particles has a percentile diameter $d_{50}$ of preferably 1 μm to 8.0 μm, more preferably 2 μm to 7.0 μm, even more preferably 3 μm to 6.0 μm and particularly preferably 4 μm to 5.0 μm.

The volume-weighted particle size distribution of the silicon particles has a percentile diameter $d_{10}$ of preferably 0.5 μm to 10 μm, particularly preferably 0.5 μm to 5.0 μm and most preferably 0.5 μm to 3.0 μm.

The volume-weighted particle size distribution of the silicon particles has a percentile diameter $d_{90}$ of preferably 2.0 μm to 20.0 μm, particularly preferably 3.0 μm to 15.0 μm and most preferably 5.0 μm to 10.0 μm.

The volume-weighted particle size distribution of the silicon particles has a width $d_{90}-d_{10}$ of preferably≤20.0 μm, more preferably≤15.0 μm, even more preferably≤12.0 μm, particularly preferably≤10.0 μm and most preferably≤7.0 μm.

The volume-weighted particle size distribution of the silicon particles can be determined by static laser scattering using the Mie model with the Horiba LA 950 instrument with alcohols such as ethanol or isopropanol for example, or preferably water as dispersant medium for the silicon particles.

The silicon particles are preferably not agglomerated, particularly preferably not aggregated. Aggregated signifies that spherical or predominantly spherical primary particles, such as are initially formed in gas phase processes in the production of silicon particles, are coalesced to form aggregates. The aggregation of primary particles may occur, for example, during the production of silicon particles in gas phase processes. Such aggregates may form agglomerates as the reaction progresses. Agglomerates are a loose cluster of aggregates. Agglomerates can be readily split again into aggregates with kneading and dispersion processes typically used. Aggregates cannot be broken down into primary particles, or only to a low extent, using these processes. Aggregates and agglomerates have by definition quite different sphericities and grain shapes to the preferred silicon particles owing to their origin. The presence of silicon particles in the form of aggregates or agglomerates can be rendered visible for example by means of conventional scanning electron microscopy (SEM). Static light scattering methods for determining particle size distributions or particle diameters of silicon particles, in contrast, cannot distinguish between aggregates or agglomerates.

The BET surface areas of the silicon particles is preferably 0.2 to 30.0 m$^2$/g, particularly preferably 0.5 to 20.0 m$^2$/g and most preferably 1.0 to 15.0 m$^2$/g. The BET surface area is determined in accordance with DIN 66131 (with nitrogen).

The silicon particles are preferably in the form of splintery grain shapes. The silicon particles have a sphericity of preferably 0.3≤ψ≤0.9, particularly preferably 0.5≤ψ≤0.85 and most preferably 0.65≤ψ≤0.85. The sphericity ψ is the ratio of the surface area of a sphere of the same volume to the actual surface area of a body (definition of Wadell). Sphericity can be determined, for example, from conventional SEM images.

The silicon particles are preferably based on elemental silicon. Elemental silicon is understood to mean high purity, polycrystalline silicon with a small proportion of foreign atoms (for example B, P, As), silicon with controlled foreign atom doping (for example B, P, As), but also silicon from metallurgical processing, which may include elemental impurity (for example Fe, Al, Ca, Cu, Zr, Sn, Co, Ni, Cr, Ti, C).

If the silicon particles contain a silicon oxide, the stoichiometry of the oxide $SiO_x$ is preferably in the range of 0<x<1.3. If the silicon particles contain a silicon oxide having higher stoichiometry, the layer thickness thereof on the surface is preferably less than 10 nm.

When the silicon particles have been alloyed with an alkali metal M, the stoichiometry of the alloy $M_ySi$ is preferably in the range of 0<y<5. The silicon particles may optionally have been prelithiated. If the silicon particles have been alloyed with lithium, the stoichiometry of the alloy $Li_zSi$ is preferably in the range of 0<z<2.2.

Particular preference is given to silicon particles containing≥80 mol % silicon and/or ≤20 mol % foreign atoms, even more preferably≤10 mol % foreign atoms.

The surface of the silicon particles may optionally be partially or at least partially or largely covered by an oxide layer or Si—OH groups. Other customary inorganic and organic groups may also be bonded to the surface of the silicon particles. To produce silicon particles bearing ethylenically unsaturated silane groups c) on the surface, silicon particles may also be used, the surface of which has been covered completely with an oxide layer and/or with Si—OH groups. To produce silicon particles bearing Si—H groups a) or organic functional groups b) on the surface, preference is given to using silicon particles of which the surface is not completely covered with an oxide layer and/or with Si—OH groups.

In the method according to the invention, silicon particles are generally used bearing on the surface a) Si—H groups, b) organic functional groups selected from the group comprising alkanes and aromatics, or preferably c) ethylenically unsaturated silane groups. Organic functional groups generally comprise one or more carbon atoms. The groups a) to c) are generally attached via covalent bonds to the silicon particles and are freely accessible on the surface of the silicon particles and are not embedded in the silicon particles or in a possible oxide layer.

Silicon particles having functional groups a) or b) are obtainable, for example, by drying processes or wet milling processes.

On milling silicon, active metal surfaces are formed, which are very reactive to the liquids in the milled dispersions. For instance, molecules of these liquids can bond to the surface of the silicon particles via addition reactions. For example, with milled dispersions comprising alcohols (R—OH) or hydrocarbons (R—H), silicon particles are obtained bearing Si—OR and Si—H bonds or Si—R and Si—H bonds on the surface. By milling, silicon particles are thus obtained having Si—H bonds and Si—R bonds where R is an alkoxy, alkyl or aryl radical.

Wet milling processes can be carried out, for example, in planetary ball mills, jet mills such as opposed jet mills or impact mills, or agitator bead mills. In wet milling processes, dispersions of silicon particles in one or more organic liquids are generally used. The organic liquids are preferably hydrocarbons, esters or especially alcohols. The alcohols preferably comprise 1 to 7 and particularly preferably 2 to 5 carbon atoms. Examples of alcohols are methanol, ethanol, propanol and butanol. Preference is given to ethanol and 2-propanol. Hydrocarbons preferably comprise 5 to 10 and particularly preferably 6 to 8 carbon atoms. Hydrocarbons may be, for example, aliphatic or aromatic. Examples of hydrocarbons are toluene, mesitylene and heptane. The esters are generally esters of carboxylic acids and alkyl alcohols such as ethyl acetate for example. Particular preference is given to hydrocarbons, especially toluene, mesitylene and heptane. Preferred organic liquids comprises less than 5% by weight water, particularly preferably less than 1% by weight and most preferably no water.

Dry milling processes can be carried out, for example, in jet mills, ball mills or hammer mills. The milling gas or the atmosphere during dry milling processes preferably comprises nitrogen, noble gases or other inert gases. In addition, the milling gas may comprise portions of water and/or organic liquids, especially those that are further detailed above for wet milling processes. To introduce the groups a) and/or b) into the silicon particles however, the impurities normally present in industrial or technical-grade gases, such as residual moisture, are also sufficient.

Also, the further characteristic parameters or properties of the silicon particles used in accordance with the invention, such as the average particle sizes thereof, can be constituted using the milling processes in a manner known per se.

Silicon particles, to which surface ethylenically unsaturated silane groups c) are attached, are obtainable for example by silanizing silicon particles with one or more ethylenically unsaturated silanes that have been substituted by one or more groups that may be cleaved hydrolytically. Examples of groups that may be cleaved hydrolytically are alkoxy and halogen, for example chlorine, groups.

The ethylenically unsaturated silanes substituted with groups that may be cleaved hydrolytically are referred to below as silanes for short.

For the silanization, it is possible to use, for example, the silicon particles produced by the dry or wet milling processes. As a result of this production or, for example, on contact with ambient air under standard conditions, the surface of the silicon particles generally undergoes oxidation. For this reason, the surface of the silicon particles is typically also coated with an oxide layer $SiO_x$ and/or Si—OH groups, as already further specified above. Via such $SiO_x$ or Si—OH groups, silane groups may be attached to the silicon particles, with release of the groups that may be cleaved hydrolytically, by condensation reactions for example with the silanes substituted with groups that may be cleaved hydrolytically.

Suitable silanes are, for example, ethylenically unsaturated silicon compounds of the general formula $R^1SiR^2_{0\sim2}X_{1\sim3}$, where $R^1$ has the definition $CH_2=CR^4-(CH_2)_{0-1}$ or $CH_2=CR^4CO_2(CH_2)_{1-3}$, $R^2$ has the definition $C_1$- to $C_{12}$-alkyl radical, preferably $C_1$ to $C_3$-alkyl radical, particularly preferably $CH_3$, X is $(OR^3)$, acetoxy or halogen, preferably Cl, $R^3$ is an unbranched or branched, optionally substituted alkyl radical having 1 to 12 carbon atoms, preferably 1 to 3 carbon atoms, or an acyl radical having 2 to 12 carbon atoms, where $R^3$ can optionally be interrupted by an ether group, and $R^4$ is H or $CH_3$.

Preference is given to silanes bearing, as radicals X, one or more $(OR^3)$ groups, preferably exclusively one or more $(OR^3)$ groups; that is to say ethylenically unsaturated alkoxysilanes are preferred.

Examples of silanes are γ-acryl- or γ-methacryloxypropyltri(alkoxy)silanes, α-methacryloxymethyltri(alkoxy)silanes, γ-methacryloxypropylmethyldi(alkoxy)silanes; vinylsilanes such as vinylalkyldi(alkoxy)silanes and vinyltri(alkoxy)silanes, where the alkoxy groups used may be, for example, methoxy, ethoxy, methoxyethylene, ethoxyethylene, methoxypropylene glycol ether or ethoxypropylene glycol ether radicals.

Examples of preferred silanes are 3-methacryloxypropyltrimethoxysilane, 3-methacryloxypropylmethyldimethoxysilane, vinyltrimethoxysilane, vinylmethyldimethoxysilane, vinyltriethoxysilane, vinylmethyldiethoxysilane, vinyltripropoxysilane, vinyltriisopropoxysilane, vinyltris(1-methoxy)isopropoxysilane, vinyltributoxysilane, vinyltriacetoxysilane, methacryloxymethyltrimethoxysilane, 3-methacryloxypropyltris (2-methoxyethoxy)silane, vinyltrichorosilane, vinylmethyldichlorosilane, vinyltris(2-methoxyethoxy)silane, allylvinyltrimethoxysilane, allyltriacetoxysilane, vinyldimethylmethoxysilane, vinyldimethylethoxysilane, vinylmethyldiacetoxysilane, vinyldimethylacetoxysilane.

Most preferred as silanes are vinyltrimethoxysilane, vinylmethyldimethoxysilane, vinyltriethoxysilane, vinylmethyldiethoxysilane, vinyltris(2-methoxyethoxy)silane, methacryloxypropyltris(2-methoxyethoxy)silane, 3-methacryloxypropyltrimethoxysilane, 3-methacryloxypropylmethyldimethoxysilane and methacryloxymethyltrimethoxysilane and mixtures thereof.

Suitable silanes are also (meth)acrylamides comprising silane groups of the general formula $CH_2=CR^5-CO-NR^5-R^6-SiR^7_n(X)_{3-n}$, where n=0 to 2, $R^5$ is H or $CH_3$, $R^6$ is an alkylene group having 1 to 5 carbon atoms or a bivalent organic group in which the carbon chain is interrupted by an O or N atom, and $R^7$ has the definition $C_1$- to $C_{12}$-alkyl radical, preferably $C_1$ to $C_3$-alkyl radical, particularly preferably $CH_3$. Examples of (meth)acrylamidoalkylsilanes are: 3-(meth)acrylamidopropyltrimethoxysilane, 3-(meth)acrylamidopropyltriethoxysilane.

The silanes are used preferably in an amount of 0.2 to 25% by weight, particularly preferably 0.5 to 10% by weight, based in each case on the total weight of the silicon particles.

The silanes and the silicon particles can be reacted as pure substance or preferably in a solvent. Suitable as solvent are, for example, the organic liquids specified further above for the wet milling processes. The solvents preferably comprise less than 1% by weight water, particularly preferably less than 0.1% by weight water and most preferably no water.

One or more acids are preferably added to the reaction mixture, for example inorganic or preferably organic acids. Lewis acids or Brönsted acids can be used. Examples of inorganic acids are sulfuric acid, hydrochloric acid or carbonic acid. Examples of organic acids are sulfonic acids, especially toluenesulfonic acid. Preference is given to using 0.05 to 5% by weight acids, based on the total weight of the silanes.

The silanization is effected at temperatures of preferably 20° C. and 105° C., particularly preferably 25° C. and 80° C. and most preferably 30° C. and 60° C.

The presence of groups a), b) or c) on the surface of the silicon particles can be detected, for example, by means of conventional surface-sensistive IR spectroscopy.

The silicon particles having groups b) or c) on the surface have a carbon content of preferably 0.03 to 2% by weight, particularly preferably 0.05 to 1% by weight and most preferably 0.06 to 0.5% by weight, based on the total weight of the silicon particles (determination method: elemental analysis).

Preference is given to using silicon particles bearing ethylenically unsaturated silane groups c) on the surface.

For the polymerization for grafting the silicon particles, suitable ethylenically unsaturated monomers may be selected, for example from the group comprising vinyl esters, (meth)acrylic esters, vinylaromatics, olefins, 1,3-dienes, vinyl halides and ethylenically unsaturated carboxylic acids, wherein the monomers may optionally bear further functional groups.

Examples of ethylenically unsaturated carboxylic acids are acrylic acid, methacrylic acid, fumaric acid and maleic acid.

Suitable, for example, are vinyl esters of carboxylic esters having 2 to 18 carbon atoms such as vinyl acetate, vinyl propionate, vinyl butyrate, vinyl 2-ethylhexanoate, vinyl laurate, 1-methylvinyl acetate, vinyl pivalate and vinyl esters of α-branched monocarboxylic acids having 9 to 11 carbon atoms, for example VeoVa9® or VeoVa10® (trade names of Resolution).

Suitable acrylic esters or methacrylic esters are, for example, esters of unbranched or branched alcohols having 1 to 22 carbon atoms, especially 1 to 15 carbon atoms. Preferred methacrylic esters or acrylic esters are methyl acrylate, methyl methacrylate, ethyl acrylate, ethyl methacrylate, n-butyl acrylate, n-butyl methacrylate. Particular preference is given to methyl acrylate, methyl methacrylate, n-butyl acrylate.

Preferred vinylaromatics are styrene, methylstyrene, vinyltoluene and vinylpyridine. Preferred vinyl halide is vinyl chloride. Preferred olefin having at least 3 carbon atoms is propylene and the preferred dienes are 1,3-butadiene and isoprene.

Cross-linked monomers can also be used, such as monomers bearing hydroxyl groups, such as hydroxyalkyl (meth)acrylates, especially hydroxyethyl, hydroxypropyl or hydroxybutyl acrylate or methacrylate; aminofunctional monomers such as 2-dimethylaminoethyl methacrylate (DMAEMA), 3-dimethylaminopropyl methacrylamide (DMAPMA); epoxide-functional monomers such as glycidyl methacrylate, glycidyl acrylate, allyl glycidyl ether, vinyl glycidyl ether; ethylenically poluunsaturated monomers such as ethylene glycol dimethacrylate, divinyl adipate, diallyl maleate, allyl methacrylate or triallyl cyanurate.

Further examples of ethylenically unsaturated monomers having further functional groups are also ethylenically unsaturated carboxamides and nitriles such as acrylamide and acrylonitrile; polyethers having ethylenically unsaturated groups such as polyethylene glycol methacrylate; monomers bearing carbonate groups such as vinylene carbonate.

Preferred monomers are acrylic acid, methacrylic acid, vinylene carbonate, methyl methacrylate, styrene, functionalized styrene derivatives and vinylpyridine. Also preferred are dimethylaminoethyl methacrylate, hydroxyethyl methacrylate, ethylene glycol dimethacrylate, glycidyl methacrylate and polyethylene glycol methacrylate.

Particularly preferred are homopolymers and copolymers of ethylenically unsaturated carboxylic acids, preferably fumaric acid, maleic acid, in particular methacrylic acid and more preferably acrylic acid. Preferred copolymers are based on (meth)acrylic acid and 0.1 to 50% by weight, particularly preferably 0.5 to 30% by weight and most preferably 1 to 10% by weight of one or or more additional ethylenically unsaturated monomers, based on the total weight of the copolymers. Further preferred copolymers are based on (meth)acrylic acid and 30 to 80% by weight, particularly preferably 40 to 70% by weight and most preferably 50 to 60% by weight of one or more additional ethylenically unsaturated monomers, especially vinylene carbonate, based on the total weight of the copolymers. The additional ethylenically unsaturated monomers are preferably the above listed or preferred various ethylenically unsaturated monomers of (meth)acrylic acid. Such monomer combinations surprisingly result in particularly advantageous, homogeneous electrode coating and lead to improved electrochemical performance of corresponding batteries.

The polymerization of the ethylenically unsaturated monomers in the presence of silicon particles can take place in the substance or in a dispersant.

Suitable dispersants are, for example, the organic liquids or inorganic liquids, such as water, specified further above for the wet milling processes. Preferred dispersants are toluene, ethyl acetate, ethanol or water. The monomers are preferably soluble in the dispersant. The silicon particles are preferably wettable by the dispersant.

Suitable radical initiators are, for example, peroxides such as t-butyl peroxy-2-ethylhexanoate, t-butyl peroxypivalate, t-butyl peroxyneodecanoate, t-amyl peroxypivalate, di(2-ethyl-hexyl) peroxydicarbonate, 1,1-bis(t-butylperoxy)-3,3,5-trimethylcyclohexane, di(4-t-butylcyclohexyl) peroxydicarbonate and especially dibenzoyl peroxide; azo initiators such as azobisisobutyronitrile. The initiators are generally used in an amount from 0.005 to 10% by weight, preferably 0.05 to 5% by weight and particularly preferably 0.1 to 3% by weight, based in each case on the total weight of the ethylenically unsaturated monomers.

The polymerization may be carried out, for example, in a stirred vessel or pressure vessel. The reaction temperature for the polymerization is preferably 20° C. to 180° C., particularly preferably 60° C. to 120° C. and most preferably 80° C. to 100° C. The pressure is, for example, in the range of 1 bar to 6 bar. The polymerization can be carried out by initially charging all or individual constituents of the polymerization mixture, or partial initial charging and post-metering of all or individual constituents of the polymerization mixture, or by the metering method without initial charging.

In the case of polymerization in a dispersant, the polymerization is carried out up to a solids content of preferably 2% to 95%, more preferably 5% to 80%, particularly preferably 10% to 50% and even more preferably 15% to 30%.

In the case of polymerization in a dispersant, the grafted silicon particles thus obtained can be separated off by sedimentation or preferably centrifugation. Alternatively, they may also be dried, for example by fluidized bed drying, freeze-drying, thermal drying, drying in a vacuum, contact drying, convection drying or by means of spray drying.

For purification, the grafted silicon particles can be separated by one or preferably two or more washing steps from unreacted monomers, by-products or particularly from free polymers. Free polymers are polymers which have not grafted onto the silicon particles.

Suitable solvents for the washing steps are, for example, the organic liquids or inorganic liquids, such as water, specified further above for the wet milling processes. It is also possible to use polar aprotic solvents such as dimethylformamide (DMF), dimethyl sulfoxide (DMSO) or acetone. Preferred solvents are toluene, acetone, ethyl acetate, ethanol or water.

Preferably, for the washing steps, one or more solvents are selected in which the free polymers are soluble and/or the grafted silicon particles are preferably dispersible. Soluble means that the free polymers are soluble in the solvent under standard conditions (23/50) in accordance with DIN50014 to an extent of preferably≥1% by weight and particularly preferably≥5% by weight.

Washing can be carried out several times with the same solvent. Preferably, washing is carried out several times successively with different solvents; for example one or more times with non-polar solvents such as toluene, and/or one or more times with protic solvents such as alcohol, and/or one or more times with polar aprotic solvents such as acetone, and/or one or more times with inorganic solvents such as water.

The washing may be conducted at temperatures of, for example, 15° C. to 80° C., preferably 20° C. to 60° C. and particularly preferably 20° C. to 40° C.

The grafted silicon particles can be separated off from the washing solutions, for example, by sedimentation or preferably centrifugation. Drying can be carried out, for example, by fluidized bed drying, freeze-drying, thermal drying, drying in a vacuum, contact drying, convection drying or by means of spray-drying.

Washing steps are preferably repeated until nothing more is washed out from the product containing the grafted silicon particles. This can be established, for example, when the last solvent used for a washing step gives rise to no residue after concentrating to dryness. Alternatively, washing can be repeated until the product used for washing and the product isolated and dried after washing comprising the grafted silicon particles have the same weight. Preferably, washing will be carried out as often as necessary until the carbon content of the product used for the washing and of the product isolated and dried after washing comprising the grafted silicon particles differ by ≤0.05% by weight (determination method: elemental analysis).

The grafted silicon particles are preferably redispersible, especially in water.

The polymers of the grafted silicon particles are attached in a wash-stable manner to the silicon particles in aqueous medium. The binding according to the invention is manifested in that, for example, the grafted silicon particles after redispersion in water release no, or essentially no, polymers. The wash-stable binding of the polymers to the silicon particles in aqueous medium can be characterized, for example, in that after washing the grafted silicon particles with water at pH 7 and 20° C. and subsequent removal of the water, for example by centrifugation or filtration, and subsequent drying of the grafted silicon particles, ≥99% by weight grafted silicon particles are reisolated, based on the dry weight of the grafted silicon particles used for determining the wash stability. The grafted silicon particles thus treated preferably comprise≥99% by weight carbon, based on the carbon content of the grafted silicon particles used for determining the wash stability (determination method: elemental analysis). Prior to determining the wash stability, the grafted silicon particles obtained by means of polymerization are preferably subjected to the washing steps described further above.

The grafted silicon particles are preferably not agglomerated, particularly preferably not aggregated. The degree of aggregation of the grafted silicon particles is preferably≤20%, particularly preferably≤10% and most preferably≤5% (determination method described further below).

The volume-weighted particle size distribution of the grafted silicon particles has a diameter percentile $d_{50}$ of preferably 700 nm to 10 µm, more preferably 1 µm to 8.0 µm, even more preferably 2 µm to 7.0 µm, particularly preferably 3 µm to 6.0 µm and most preferably 4 µm to 5.0 µm.

The volume-weighted particle size distribution of the grafted silicon particles has a width $d_{90}$-$d_{10}$ of preferably≤20.0 µm, more preferably≤15.0 µm, even more preferably≤12.0 µm, particularly preferably≤10.0 µm and most preferably≤7.0 µm.

The volume-weighted particle size distribution of the grafted silicon particles can be determined by static laser scattering using the Mie model with the Horiba LA 950 instrument with alcohols such as ethanol or isopropanol for example, or preferably water as dispersant medium for the redispersible silicon particles.

The BET surface areas of the grafted silicon particles are preferably 0.2 to 30.0 m$^2$/g, particularly preferably 0.5 to 20.0 m$^2$/g and most preferably 1.0 to 15.0 m$^2$/g. The BET surface area is determined in accordance with DIN 66131 (with nitrogen).

The grafted silicon particles are preferably in the form of splintery grain shapes. The redispersible particles from step b) have a sphericity of preferably 0.3≤ψ≤0.9, particularly preferably 0.5≤ψ≤0.85 and most preferably 0.65≤ψ≤0.85. The sphericity ψ is the ratio of the surface area of a sphere of the same volume to the actual surface area of a body (definition of Wadell). Sphericity can be determined, for example, from conventional REM images.

The grafted silicon particles are preferably based on 80 to 99.7% by weight, more preferably 90 to 99.5% by weight, particularly preferably 95 to 99.2% by weight and most preferably 95 to 98.5% by weight silicon, based in each case on the total weight of the grafted silicon particles (determination method: elemental analysis).

The grafted silicon particles have a carbon content of preferably 0.2 to 10% by weight, based on the total weight of the grafted silicon particles (determination method: elemental analysis).

The grafted silicon particles are preferably based on 0.3 to 20% by weight, more preferably 0.5 to 10% by weight, particularly preferably 0.8 to 5% by weight and most preferably 1.5 to 5% by weight polymers, based in each case on the total weight of the grafted silicon particles. The composition of the grafted silicon particles is accessible, for example, by means of the elemental analysis described further below. The polymer fraction can be calculated, for example, from the measured carbon fraction of the grafted silicon particles and the carbon fraction of the polymers grafted thereon. For this purpose, the measured carbon fraction of the grafted silicon particles is divided by the carbon fraction of the polymers grafted thereon.

The mean thickness of the layer of polymers grafted onto the silicon particles is preferably between 1 and 200 nm, particularly preferably between 5 and 100 nm, most preferably between 10 and 50 nm. The mean layer thickness is accessible via the following formula:

$$d(\text{Polymer}) = \frac{\frac{[C]}{[C_{Polymer}] * \rho_{Polymer}}}{\left[1 - \frac{[C]}{[C_{Polymer}]}\right] * \left[\frac{6}{\rho_{Silicon} * d_{50}}\right]}$$

in which the individual parameters have the following definition:

d(Polymer): mean layer thickness of the polymer;

[C]: carbon fraction of the grafted silicon particles, determined by elemental analysis;

$[C_{polymer}]$: carbon fraction of the polymer, determined by elemental analysis;

$\rho_{Polymer}$: density of the polymer, determined by gas pycnometry in accordance with DIN 66137-2;

$\rho_{silicon}$: density of silicon (2.3 g/cm$^3$);

$d_{50}$: average particle size distribution of the silicon particles, determined by light scattering;

The density of polyacrylic acid is, for example, 1.4 g/cm$^3$.

The invention further relates to aqueous ink formulations comprising one or more binders, optionally graphite, optionally one or more further electrically conducting components and optionally one or more additives, characterized in that grafted silicon particles according to the invention are present.

The invention further relates to anode materials for lithium ion batteries comprising one or more binders, optionally graphite, optionally one or more further electrically conducting components and optionally one or more additives, characterized in that one or more grafted silicon particles according to the invention are present.

Preferred formulations for the anode material of the lithium ion batteries preferably comprise 5 to 95% by weight, especially 60 to 85% by weight grafted silicon particles; 0 to 40% by weight, especially 0 to 20% by weight further electrically conducting components; 0 to 80% by weight, especially 5 to 30% by weight graphite; 0 to 25% by weight, preferably 1 to 20% by weight, particularly preferably 5 to 15% by weight binders; and optionally 0 to 80% by weight, especially 0.1 to 5% by weight additives; wherein the figures in % by weight refer to the total weight of the anode material and the proportions of all constituents of the anode material add up to 100% by weight.

In a preferred formulation of the anode material, the fraction of graphite particles and further electrically conducting components is in sum total at least 10% by weight, based on the total weight of the anode material.

The anode ink has a pH of preferably 5.5 to 8.5 and particularly preferably 6.5 to 7.5 (determined at 20° C., for example using a pH meter from WTW pH 340i with SenTix RJD probe).

The invention further relates to lithium ion batteries comprising a cathode, an anode, a separator and an electrolyte, characterized in that the anode is based on the aforementioned anode material according to the invention.

To produce the anode materials and lithium ion batteries according to the invention, in addition to the grafted silicon particles according to the invention, the starting materials commonly used for this purpose and the customary methods for producing anode materials and lithium ion batteries are used, as described for example in the patent application with the application number DE 102015215415.7.

The invention further relates to lithium ion batteries comprising a cathode, an anode, a separator and an electrolyte, characterized in that the anode is based on the aforementioned anode material according to the invention; and the anode material of the fully charged lithium ion battery is only partially lithiated.

The present invention further relates to methods for charging lithium ion batteries comprising a cathode, an anode, a separator and an electrolyte, characterized in that the anode is based on the aforementioned anode material according to the invention; and the anode material is only partially lithiated in the case of complete charging of the lithium ion battery.

The present invention further relates to the use of the anode materials according to the invention in lithium ion batteries, which are so configured that the anode materials in the fully charged state of the lithium ion battery are only partially lithiated.

It is therefore preferable that the anode material, especially the silicon particles, is only partially lithiated in the fully charged lithium ion battery. Fully charged refers to the state of the battery in which the anode material of the battery has its maximum loading of lithium. Partial lithiation of the anode material means that the maximum lithium uptake capacity of the silicon particles in the anode material is not exploited. The maximum lithium uptake capacity of the silicon particles generally corresponds to the formula $Li_{4.4}Si$ and is therefore 4.4 lithium atoms per silicon atom. This corresponds to a maximum specific capacity of 4200 mAh per gram of silicon.

The ratio of lithium atoms to silicon atoms in the anode of a lithium ion battery (Li/Si ratio) can be adjusted, for example, by the flow of electrical charge. The degree of lithiation of the anode material or of the silicon particles present in the anode material is proportional to the electrical charge flowing. In this variant, when charging the lithium ion battery, the capacity of the anode material for lithium is not fully exploited. This results in a partial lithiation of the anode.

In an alternative preferred variant, the Li/Si ratio of a lithium ion battery is adjusted by cell balancing. For this purpose, the lithium ion batteries are designed such that the the lithium uptake capacity of the anode is preferably greater than the lithium discharge capacity of the cathode. The result of this is that, in the fully charged battery, the lithium uptake capacity of the anode is not fully exhausted, i.e. the anode material is only partially lithiated.

In the case of partial lithiation according to the invention, the Li/Si ratio in the anode material in the fully charged state of the lithium ion battery is preferably≤2.2, particularly preferably≤1.98 and most preferably≤1.76. The Li/Si ratio in the anode material in the fully charged state of the lithium ion battery is preferably≥0.22, particularly preferably≥0.44 and most preferably≥0.66.

The capacity of the silicon of the anode material of the lithium ion battery is used preferably to an extent of ≤50%, particularly preferably to an extent of ≤45% and most preferably to an extent of ≤40%, based on a capacity of 4200 mAh per gram of silicon.

The anode is preferably charged with ≤1500 mAh/g, particularly preferably≤1400 mAh/g and most preferably≤1300 mAh/g, based on the mass of the anode. The anode is preferably charged with at least 600 mAh/g, particularly preferably≥700 mAh/g and most preferably≥800 mAh/g, based on the mass of the anode. These figures refer preferably to the fully charged lithium ion battery.

The degree of lithiation of silicon or the exploitation of the capacity of silicon for lithium (Si capacity utilization α) may be determined, for example, as described in the patent application with application number DE 102015215415.7 on page 11, line 4 to page 12, line 25, in particular based on the formula specified therein for the Si capacity utilization α and the supplementary information under the headings "Determination of the delithiation capacity β" and "Determination of the Si proportion by weight $\omega_{Si}$" ("incorporated by reference").

Surprisingly, the grafted silicon particles according to the invention are wash-stable, especially in aqueous medium. The polymers are, unexpectedly, stably attached to the grafted silicon particles and are not washed off the grafted silicon particles in aqueous medium. Advantageously, the products according to the invention are in the form of particles. Even non-aggregated grafted silicon particles are accessible.

The grafted silicon particles according to the invention are advantageously also stable in aqueous ink formulations for anodes of lithium ion batteries and under such conditions, surprisingly, have little or no tendency to hydrogen formation. The reactivity of the surface of the silicon particles is thus dramatically reduced in the particles according to the invention. This enables processing without foaming of the aqueous ink formulation and the production of particularly homogeneous and gas bubble-free anodes.

In addition, anodes according to the invention exhibit better electrochemical performance. Further improvement can be achieved of the cycle stability of lithium ion batteries if the batteries are operated under partial charging.

The following examples serve to further elucidate the invention:

The following analytical methods and instruments were used for the characterization:

Determination of Particle Sizes:

Measurement of the particle distribution was carried out by means of static laser scattering using a Horiba LA 950 and the Mie model in a highly diluted suspension in water or ethanol. The average particle sizes specified are volume-weighted.

Inorganic Analysis/Elemental Analysis:

Carbon contents were determined using a Leco CS 230 analyzer and a Leco TCH-600 analyzer was used to determine O and N contents.

Determination of the Degree of Aggregation/Sieve Residue>20 μm:

A sample of the polymer-coated particles obtained after drying was freed of oversize particles>20 μm by wet sieving with water on stainless steel sieves using an AS 200 basic (Retsch GmbH) sieve machine. The sieve residue was dried and weighed and the sieve residue>20 μm thus determined.

Determination of Hydrogen Evolution ($H_2$ Evolution) by GC Measurement (Headspace):

50 mg (for determination at 80° C.) or 100 mg (for determination at 40° C.) of sample was weighed into a GC headspace glass vial (22 ml), 5 ml of an aqueous Li acetate buffer (pH 7; 0.1 M) were added, the glass vial sealed and heated with stirring at 80° C. in an aluminum block for 30 minutes. Determination of the hydrogen content in the gas phase was performed by GC measurement. Detection was by means of thermal conductivity detection. The figure for the proportion of hydrogen was provided in volume percent in the gas phase. Further detected gases were oxygen, nitrogen and argon.

EXAMPLE 1

Production of silicon particles by milling:

The silicon powder was produced by milling a coarse Si chip from production of solar silicon in a fluidized bed jet mill (Netzsch-Condux CGS16 with 90 m³/h nitrogen at 7 bar as milling gas).

Particle size distribution of the silicon particles thus obtained (determined with ethanol as dispersant): d10=2.23 μm, d50=4.48 μm and d90=7.78 μm and width (d90-d10) of 5.5 μm.

The REM image of the dry Si dust in FIG. 2 shows that the sample consisted of individual, non-aggregated, splinter-shaped particles.

The O content of the particles was 0.23%.

Gas evolution, determined by stirring Si particles (50 mg) in 5 ml of 0.1 M Li acetate (pH 7) in an HGC headspace vial (total volume 22 ml), at 80° C. for 30 min and determination of the amount of $H_2$ in the headspace afforded 4.36% by volume hydrogen.

EXAMPLE 2

Silanization of silicon particles:

25 g of Si particles from example 1 were initially charged in 200 ml of toluene and 2.5 g of 3-(trimethoxysilyl)propyl methacrylate were added, degassed, p-toluenesulfonic acid (50 mg) was added and the mixture stirred at 40° C. for 3 h. The reaction mixture was then centrifuged, the sediment was washed with toluene and ethanol and dried under vacuum at 60° C. The particles obtained had a carbon content of 0.07% by weight and were used directly in further reactions.

EXAMPLE 3

Coating of the silicon particles with polyacrylic acid:

10 g of the Si particles from example 2 were suspended in 100 ml of toluene and 2 g of acrylic acid were added. The suspension obtained was degassed and flushed with argon. 40 mg of AIBN were added as initiator and the suspension obtained was heated at 80° C. for 1 h. After cooling the reaction solution, the particles were separated from the supernatant by centrifugation and freed from excess monomer and free polymer by repeated washing with ethanol, water and acetone. The particles obtained were dried under vacuum at 60° C.

In the product thus obtained the polyacrylic acid was attached to the silicon particles in a wash-stable manner, particularly in aqueous medium.

The product obtained had an O content of 0.72% and a C content of 0.53%. This corresponds to a polymer content of 1.1% by weight and a calculated average layer thickness of polymer of 14 nm.

Measurement of the particle distribution of the product obtained in this case by means of static laser scattering using a Horiba LA 950 and the Mie model in a highly diluted suspension in water gave d10=2.30 μm, d50=4.73 μm and d90=7.98 μm and a width (d90-d10) of 5.68 μm.

The sieve residue>20 μm was less than 1%.

The $H_2$ content in the gas phase is 0.00% by volume.

EXAMPLE 4

Coating of the silicon particles with an acrylic acid-vinylene carbonate copolymer:

10 g of the Si particles from example 2 were suspended in 100 ml of toluene and 5.5 g of vinylene carbonate and 4.5 g of acrylic acid.

The suspension obtained was degassed and flushed with argon. 80 mg of AIBN as initiator were added and the suspension obtained was heated at 80° C. for 1 h. After cooling the reaction solution, the particles were separated from the supernatant by centrifugation and freed from excess monomer and free polymer by repeated washing with ethanol, water and acetone. The particles obtained were dried under vacuum at 60° C.

In the product thus obtained the copolymer was attached to the silicon particles in a wash-stable manner, particularly in aqueous medium.

The product obtained had an O content of 0.75% and a C content of 0.46%. This corresponds to a polymer content of 1.0% by weight and a calculated average layer thickness of the polymer of 12 nm.

Measurement of the particle distribution of the product obtained in this case by means of static laser light scattering using a Horiba LA 950 and the Mie model in a highly diluted suspension in water gave d10=2.34 µm, d50=4.77 µm and d90=8.06 µm and a width (d90-d10) of 5.72 µm.

The sieve residue>20 µm was less than 1%.

The $H_2$ content in the gas phase is 0.00% by volume.

EXAMPLE 5

Anode using the product from example 3:

29.709 g of polyacrylic acid dried to constant weight and 756.60 g of deionized water were agitated by means of a shaker (290 l/min) at 85° C. for ca. 2.5 h until complete dissolution of the polyacrylic acid. Lithium hydroxide monohydrate was added portionwise to the solution until the pH was 7.0 (measured using a WTW pH 340i pH meter and SenTix RJD probe). The solution was then mixed by means of a shaker for a further 4 h. 7.00 g of the silicon particles from example 3 were then dispersed in 12.50 g of the neutralized polyacrylic acid solution and 5.10 g of deionized water by means of a dissolver at an orbital speed of 4.5 m/s for 5 min and 12 m/s for 30 min with cooling at 20° C. After addition of 2.50 g of graphite (Imerys, KS6L C), the mixture was then further stirred for 30 min at an orbital speed of 12 m/s. After degassing, the dispersion was applied to a copper foil (Schlenk Metallfolien, SE-Cu58) at a thickness of 0.030 mm by means of a film drawing frame having a gap height of 0.08 mm (Erichsen, model 360). The anode coating thus produced was then dried at 80° C. and 1 bar atmospheric pressure for 60 min.

The average weight per unit area of dry anode coating of example 5 with the particles of example 3 was 2.97 mg/cm² and the coating density was 0.99 g/cm³. The average weight per unit area of dry anode coating of example 6 with the particles of example 4 was 2.73 mg/cm² and the coating density was 0.93 g/cm³.

EXAMPLE 6

Anode using the product from example 4:

Example 6 was carried out identically to example 5, with the only difference that the silicon particles of example 4 were used instead of the silicon particles of example 3.

EXAMPLE 7 (Ex. 7)

Lithium ion batteries according to the invention using the anode of example 5:

Electrochemical investigations were carried out on a coin cell (Type CR2032, Hohsen Corp.) in a 2-electrode arrangement. The electrode coating of example 5 was used as counter electrode or negative electrode (Dm=15 mm) and a coating based on lithium-nickel-manganese-cobalt oxide 6:2:2 having a content of 94.0% and average weight per unit area of 14.8 mg/cm² was used as working electrode or positive electrode (Dm=15 mm). A glass fiber filter paper (Whatman, GD Type D) impregnated with 120 µl of electrolyte served as separator (Dm=16 mm). The electrolyte used consisted of a 1.0 molar solution of lithium hexafluorophosphate in a 3:7 (v/v) mixture of fluoroethylene carbonate and ethyl methyl carbonate which had been admixed with 2.0% by weight of vinylene carbonate. The construction of the cell was carried out in a glove box (<1 ppm $H_2O$, $O_2$), and the water content in the dry matter of all components used was below 20 ppm.

Electrochemical testing was carried out at 20° C. The cell is charged by the cc/cv method (constant current/constant voltage) with constant current of 5 mA/g (corresponds to C/25) in the first cycle and of 60 mA/g (corresponds to C/2) in the following cycles and, after reaching the voltage limit of 4.2 V, with constant voltage until falling below a current of 1.2 mA/g (corresponds to C/100) or 15 mA/g (corresponds to C/8).

The cell is discharged by the cc method (constant current) with constant current of 5 mA/g (corresponds to C/25) in the first cycle and of 60 mA/g (corresponds to C/2) in the following cycles until reaching the voltage limit of 3.0 V. The specific current selected referred to the weight of the coating of the positive electrode.

EXAMPLE 8 (Ex. 8)

Lithium ion batteries according to the invention using the anode of example 6:

Example 8 was carried out identically to example 7, with the only difference that the electrode coating of example 6 was used instead of the electrode coating of example 5.

COMPARATIVE EXAMPLE 9

Anode with the non-polymer-coated silicon particles of example 1:

An anode was produced analogous to example 5 using the silicon particles of example 1. The average weight per unit area of the anode coating thus produced was 2.94 mg/cm² and the coating density 1.0 g/cm³.

COMPARATIVE EXAMPLE 10 (CEx. 10)

Lithium ion battery using the anode of comparative example 9: the anode with the non-coated silicon particles of comparative example 9 was tested as described in example 7.

Owing to the formulation in (comparative) examples 7, 8 and 10, the lithium ion battery was operated by cell balancing with partial lithiation of the anode. The test results of example 7 and 8 and comparative example 10 are summarized in table 1.

TABLE 1

Test results of (comparative) examples 7, 8 and 10:

| (C) Ex. | Polymer-grafted silicon | Discharge capacity after cycle 1 [mAh/cm$^2$] | Cycle number with ≥80% capacity maintenance |
|---|---|---|---|
| 7 | Yes | 2.05 | 213 |
| 8 | Yes | 2.02 | 218 |
| 10 | No | 2.03 | 187 |

The lithium ion batteries of example 7 and 8 surprisingly show a more stable electrochemical behavior compared to the lithium ion battery of comparative example 10.

COMPARATIVE EXAMPLE 11

Coating of Si particles with polyacrylic acid salt:
0.65 g of sodium hydroxide was dissolved in 500 ml of water, 1.365 g of polyacrylic acid were added and the mixture was stirred until a clear solution was obtained. The pH of the solution was 6.0.

To 250 ml of this solution were added 25 g of Si particles of example 1 and the mixture was stirred at 25° C. for 30 minutes.

The solvent was then removed at 150° C. and the particles dried at 80° C. under full vacuum.

The particles obtained had a C content of 0.64% and an O content of 23.5%.

5 g of the coated particles obtained were washed with water. As a result, the entire coating was removed (established by determination of the C content of the Si particles). The wash stability is therefore negative.

The invention claimed is:

1. A method for preparing polymer-grafted silicon particles having an average particle size $d_{50}$ of 2 µm to 8 µm, and having polymers attached to the silicon particles in a wash-stable manner in an aqueous medium comprising:
    polymerizing one or more ethylenically unsaturated monomers in the presence of silicon particles having average particle sizes of 700 nm to 10 µm by radically initiated polymerization, wherein a surface of the silicon particles used bears one or more functional groups selected from the group consisting of, a) Si-H groups; b) organic functional groups, wherein the organic functional groups are alkanes and aromatics; and c) ethylenically unsaturated silane groups;
    milling the silicon particles having Si-H groups a) and/or organic functional groups b) after a drying process or wet milling process, and
    silanizing the silicon particles having ethylenically unsaturated silane groups c) which have been substituted by one or more groups that may be cleaved hydrolytically.

2. The method for preparing polymer-grafted silicon particles of claim 1, wherein the silicon particles bearing organic functional groups b) and/or ethylenically unsaturated silane groups c) on the surface have a carbon content of 0.03 to 2% by weight, based on the total weight of the silicon particles.

3. The method for preparing polymer-grafted silicon particles of claim 1, wherein ethylenically unsaturated monomers for radically intitiated polymerization are selected from the group consisting of: acrylic acid, methacrylic acid, vinylene carbonate, methyl methacrylate, styrene, functionalized styrene derivatives, vinylpyridine, dimethylaminoethyl methacrylate, hydroxyethyl methacrylate, ethylene glycol dimethacrylate, glycidyl methacrylate and polyethylene glycol methacrylate.

4. The method of claim 1, wherein the polymer-grafted silicon particles have a carbon content of 0.2 to 10% by weight, based on the total weight of the polymer-grafted silicon particles.

5. An anode material for lithium ion batteries comprising:
    one or more binders,
    optionally graphite,
    optionally one or more further electrically conducting components, and
    optionally one or more additives,
    and polymer-grafted silicon particles having an average particle size $d_{50}$ of 2 µm to 8 µm having polymers attached to the silicon particles, in a wash-stable manner in an aqueous solution.

6. A lithium ion battery comprising:
    a cathode,
    an anode,
    a separator, and
    an electrolyte, wherein the anode is based on an anode material comprising polymer-grafted silicon particles having an average particle size $d_{50}$ of 2 µm to 8 µm having polymers attached to the silicon particles, in a wash-stable manner in an aqueous solution.

7. The lithium ion battery of claim 6, wherein the anode material is only partially lithiated in a fully charged lithium ion battery.

8. The lithium ion battery of claim 7, wherein the anode in the fully charged lithium ion battery is charged with 600 to 1500 mAh/g, based on the mass of the anode.

9. The lithium ion battery of claim 7, wherein, in the lithium ion battery in the fully charged state, the ratio of lithium atoms to silicon atoms in the anode material is ≤2.2.

10. The lithium ion battery of claim 7, wherein the capacity of the silicon of the anode material in the lithium ion battery is utilized to an extent of ≤50%, based on the maximum capacity of 4200 mAh per gram of silicon.

* * * * *